United States Patent
Yamaguchi et al.

(10) Patent No.: US 10,782,225 B2
(45) Date of Patent: Sep. 22, 2020

(54) OPTICAL MEASUREMENT CELL AND PARTICLE PROPERTIES MEASURING INSTRUMENT USING THE SAME

(71) Applicant: HORIBA, Ltd., Kyoto-shi, Kyoto (JP)

(72) Inventors: Tetsuji Yamaguchi, Kyoto (JP); Toshikazu Yurugi, Kyoto (JP); Makoto Nagura, Kyoto (JP); Takashi Kimba, Kyoto (JP); Tetsuya Mori, Kyoto (JP)

(73) Assignee: HORIBA, LTD., Kyoto (JP)

( * ) Notice: Subject to any disclaimer, the term of this patent is extended or adjusted under 35 U.S.C. 154(b) by 31 days.

(21) Appl. No.: 16/013,431

(22) Filed: Jun. 20, 2018

(65) Prior Publication Data

US 2018/0372614 A1    Dec. 27, 2018

(30) Foreign Application Priority Data

Jun. 22, 2017 (JP) ................................ 2017-122551
Jun. 1, 2018 (JP) ................................ 2018-106008

(51) Int. Cl.
*G01N 15/14* (2006.01)
*G01N 15/02* (2006.01)
*G01N 21/09* (2006.01)
*G01N 21/03* (2006.01)

(52) U.S. Cl.
CPC ..... *G01N 15/1436* (2013.01); *G01N 15/0211* (2013.01); *G01N 21/09* (2013.01); *G01N 2021/0375* (2013.01)

(58) Field of Classification Search
CPC ........... G01N 15/0211; G01N 15/1436; G01N 2021/0375; G01N 21/09; G01N 15/0205; G01N 2015/0053; G01N 21/05
See application file for complete search history.

(56) References Cited

U.S. PATENT DOCUMENTS

| 4,929,847 A | * | 5/1990 | Yamazoe | ............. | G01N 21/314 |
| | | | | | 250/573 |
| 2006/0175732 A1 | | 8/2006 | Masuch | | |
| 2018/0318839 A1 | * | 11/2018 | Liu | ........................ | B01L 7/525 |

FOREIGN PATENT DOCUMENTS

| GB | 2261285 A | 5/1993 |
| JP | 2910596 B2 | 4/1999 |

OTHER PUBLICATIONS

Search Report dated Dec. 20, 2018 from the corresponding Great Britain Application No. 1810140.2.

* cited by examiner

*Primary Examiner* — Hina F Ayub
*Assistant Examiner* — Amanda Merlino
(74) *Attorney, Agent, or Firm* — Lucas & Mercanti, LLP (57) ABSTRACT

The present invention is one that makes it possible to facilitate the assembly of an optical measurement cell, as well as shorten optical path length without taking account of handling of a spacer, and an optical measurement cell 2 including a pair of light transmitting plates 21 and 22 respectively having opposite surfaces 21a and 22a facing each other and containing test liquid X between the pair of opposite surfaces 21a and 22a of the pair of light transmitting plates 21 and 22. In addition, one 21a of the opposite surfaces 21a and 22a is formed with a spacer film 25 that contacts with the other opposite surface 22a to define the distance between the pair of opposite surfaces 21a and 22a.

11 Claims, 7 Drawing Sheets

OPTICAL MEASUREMENT CELL AND PARTICLE PROPERTIES MEASURING INSTRUMENT USING THE SAME

CROSS REFERENCE TO RELATED APPLICATION

This Application claims the priority of Japanese Patent Application No. JP 2017-122551 filed on Jun. 22, 2017 and Japanese Patent Application No. JP 2018-106008 filed on Jun. 1, 2018, applications which are incorporated herein by reference.

TECHNICAL FIELD

The present invention relates to an optical measurement cell and a particle properties measuring instrument using the optical measurement cell.

BACKGROUND ART

As a particle properties measuring instrument, there is a particle size distribution measuring instrument for measuring the particle size distribution of particles contained in test liquid. As disclosed in Patent Literature 1, for example, when measuring highly concentrated and low viscosity test liquid such as undiluted ink solution, the conventional particle size distribution measuring instrument uses an optical measurement cell configured by sandwiching a spacer between a pair of light transmitting plates. In addition, as the spacer, one made of Teflon or metal is used.

In order to measure the highly concentrated test liquid without dilution, it is necessary to shorten optical path length so that the test liquid contained in the optical measurement cell has a predetermined transmittance. For this reason, in the configuration of the optical measurement cell described in Patent Literature 1, the spacer that is thin enough to correspond to the optical path length has to be used.

However, when, in the process of assembling the optical measurement cell using the thin spacer, sandwiching the spacer between the pair of light transmitting plates, the spacer is subjected to deformation such as distortion, thus making the assembling work difficult. Also, the thin spacer is difficult to handle, and when sandwiching the spacer between the pair of light transmitting plates, and when cleaning the optical measurement cell, the spacer is likely to be broken, so it is difficult to reuse the spacer. Such problems become more apparent as the spacer is thinned.

CITATION LIST

Patent Literatures

Patent Literature 1: Japanese Patent No. 2910596

SUMMARY OF INVENTION

Technical Problem

The present invention has been made in order to solve the above-described problems, and a main object thereof is to make it easy to assemble an optical measurement cell, as well as to make it possible to shorten optical path length without taking account of handling of a spacer.

Solution to Problem

That is, an optical measurement cell according to the present invention is one including a pair of light transmitting plates respectively having opposite surfaces facing each other and containing fluid between the pair of opposite surfaces of the pair of light transmitting plates. In addition, one opposite surface of the pair of opposite surfaces is formed with a spacer film that contacts with the other opposite surface to define a distance between the pair of opposite surfaces.

In such an optical measurement cell, since the spacer film is formed on the one opposite surface of the pair of light transmitting plates, only by superposing the pair of light transmitting plates on each other, the optical measurement cell having a predetermined optical path length can be configured, thus making it possible to facilitate the assembly of the optical measurement cell. Also, since the optical path length can be defined by the thickness of the spacer film integrally formed on the opposite surface, it is not necessary to take account of spacer deformation or damage occurring when a spacer as a separate body is used, and therefore the optical path length can be shortened. Further, since a spacer as a separate body is not used, an assembling error of the optical measurement cell can be reduced, and as a result, the optical axis alignment of the optical measurement cell performed before measuring particle size distribution can be facilitated. In addition, since the spacer film is integrally formed on the one light transmitting plate, when cleaning the optical measurement cell, the cleaning work can be simplified.

As a specific embodiment of the spacer film, it is conceivable that the spacer film is a film deposited and integrally formed on the opposite surface of the light transmitting plate and an evaporated film, plating film, sputtered film, a printed film formed on the one opposite surface. Using such a film enables the optical path length to be made as short as, for example, 1 μm to 2 μm.

It is preferable that the light transmitting plate formed with the spacer film is provided with an introduction part for introducing the fluid between the pair of opposite surfaces and a lead-out part for leading out the fluid. This configuration makes it possible to hold the light transmitting plate utilizing the configuration of the introduction and lead-out parts in the processing step of spacer film deposition.

It is preferable that at least one of the pair of light transmitting plates is formed with an electrically conductive film serving as a heat generation part. In this configuration, by using a transparent conductive film as the electrically conductive film, the whole including the area where light is incident or output can be heated.

As a specific embodiment of the optical measurement cell, it is conceivable that the pair of light transmitting plates are mutually different in thickness. In this configuration, a light transmitting plate having smaller plate thickness is more easily reflected with the temperature of the fluid and a variation in it than a light transmitting plate having larger plate thickness. In addition, by detecting the temperature of the light transmitting plate having smaller plate thickness with, for example, a radiation thermometer, the temperature of the fluid in the cell can be accurately measured. Also, in this case, the electrically conductive film is preferably formed on the light transmitting plate having larger plate thickness.

Further, a particle properties measuring instrument according to the present invention includes the above-described optical measurement cell.

Such a particle properties measuring instrument can also produce the same working effects as those of the above-described optical measurement cell.

Advantageous Effects of Invention

According to the present invention configured as described above, since the spacer film is formed on the one opposite surface of the pair of light transmitting plates, the assembly of the optical measurement cell can be facilitated, and also the optical path length can be shortened without taking account of handling of the spacer.

DESCRIPTION OF EMBODIMENTS

In the following, one embodiment of the particle properties measuring instrument using the optical measurement cell according to the present invention will be described with reference to the drawings.

A particle properties measuring instrument 100 according to the present embodiment is a particle size distribution measuring instrument that, using Mie scattering theory that a light intensity distribution with respect to the spread angles of diffracted/scattered light occurring when irradiating particles with light is determined by particle sizes, measures particle size distribution by detecting the diffracted/scattered light.

Figure 1:
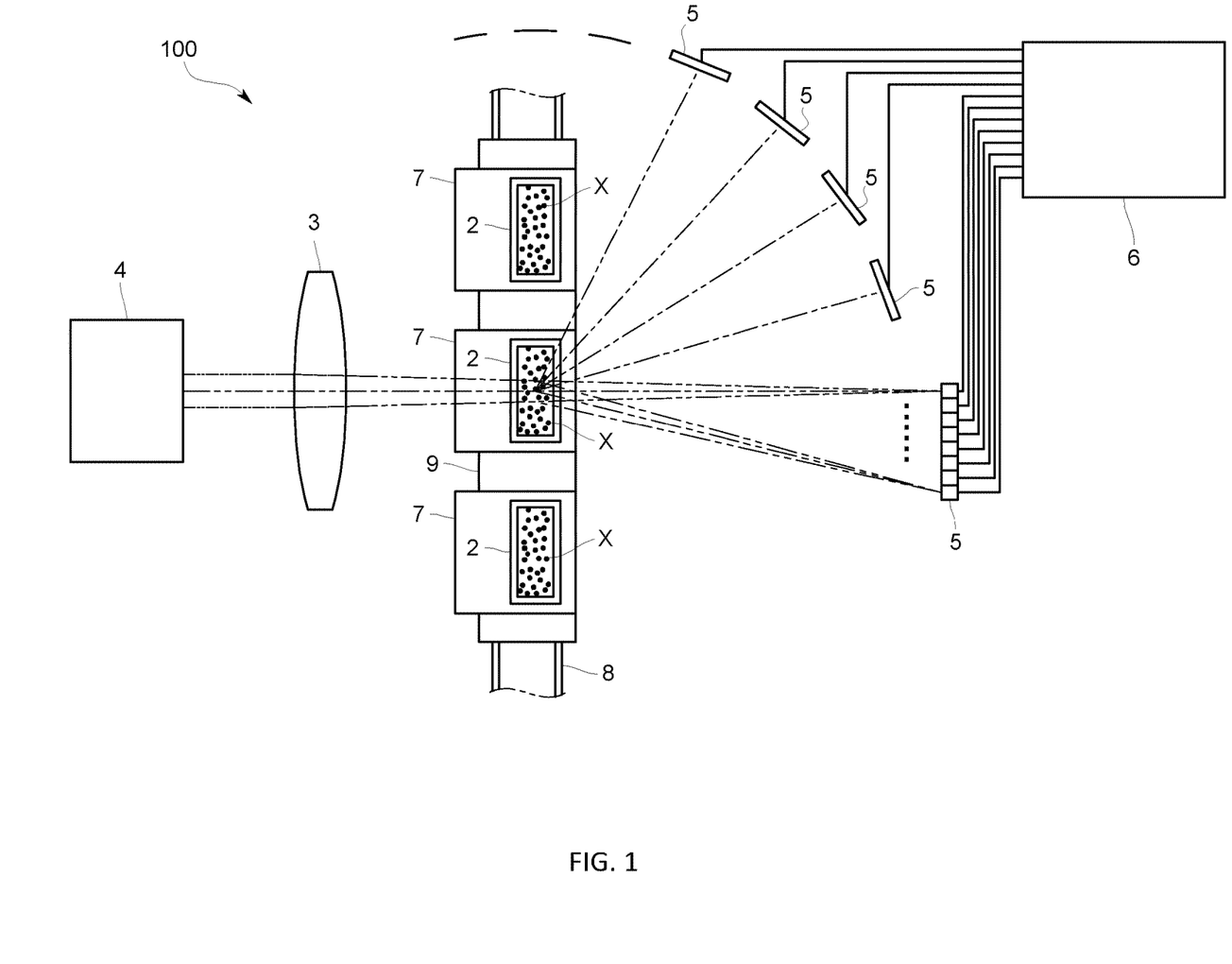
FIG. 1 is a schematic configuration view of a particle properties measuring instrument using an optical measurement cell in the present embodiment.
Figure 2:
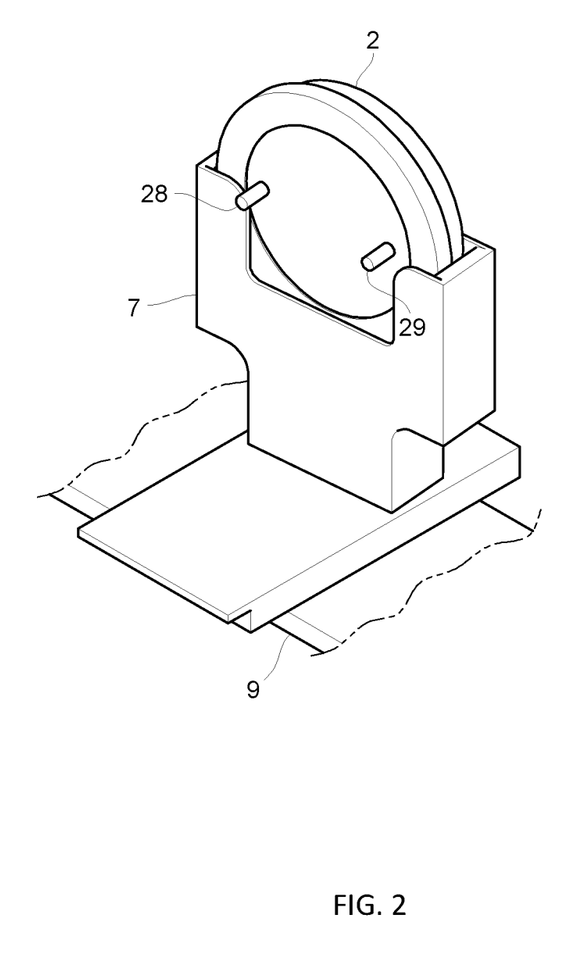
FIG. 2 is a perspective view schematically illustrating the configuration of the optical measurement cell and a cell holder in the same embodiment.

Specifically, as illustrated in FIGS. 1 and 2, the particle properties measuring instrument 100 includes: an optical measurement cell 2 of, for example, a batch type set in a cell holder 7; a laser device 4 as a light source that irradiates test liquid X in the optical measurement cell 2 with laser light through a lens 3; multiple light detectors 5 that, depending on a spread angle, detects the light intensity of diffracted/scattered light caused by the laser light irradiation; and a calculation device 6 that receives light intensity signals outputted from the respective light detectors 5 to calculate the particle size distribution of particles contained in the test liquid X.

Note that in the particle properties measuring instrument 100 of the present embodiment, the cell holder 7 is provided on a sliding member 9 adapted to slide on rails 8, and the optical measurement cell 2 is configured to be movable between a light irradiation position where the optical measurement cell 2 set in the cell holder 7 is positioned in an optical path and a withdrawal position withdrawn from the optical path. FIG. 1 illustrates an example where multiple cell holders 7 respectively set with optical measurement cells 2 are provided on the sliding member 9. Alternatively, on the sliding member 9, cell holders respectively set with multiple types of measurement cells (such as dry type cells or wet type flow cells) different from the optical measurement cell 2 may be provided. In addition, the cell holders 7 respectively hold the optical measurement cells 2 at a tilt with respect to the laser light so that the laser light is not perpendicularly incident on the optical measurement cells 2.

Using such a configuration having the sliding member 9, the following procedure may be taken.

For example, a first cell holder 7 holding an optical measurement cell 2 containing only a solvent, a second cell holder 7 holding an optical measurement cell 2 that contains the test liquid X that consists of the solvent and particles and whose optical path length is set to 1 µm, and a third cell holder 7 holding an optical measurement cell 2 that contains the test liquid X consisting of the solvent and particles and whose optical path length is set to 3 µm are set on the sliding member 9. In addition other cell holders 7 may be set.

Then, the optical measurement cell 2 in the first cell holder 7 is moved to the light irradiation position to perform background measurement (transmitted light measurement). Subsequently, the optical measurement cell 2 in the second cell holder 7 and the optical measurement cell 2 in the third cell holder 7 are sequentially moved to the light irradiation position to perform the transmitted light measurement under the different optical path length conditions. After that, an optical measurement cell 2 having an optical path length resulting in a transmittance of 85 to 90% is determined, and the particle size distribution is measured using the determined optical measurement cell 2.

The optical measurement cell 2 will be described below with reference to FIGS. 3 to 6. Note that among members illustrated in FIGS. 3 to 6, at least film thickness is given exaggerated for the purpose of clear illustration.

The optical measurement cell 2 is a batch type one containing the test liquid X having a predetermined viscoelasticity. The optical measurement cell 2 of the present embodiment is one that contains a highly concentrated and low viscosity sample such as ink, and used to analyze the test liquid X having a viscosity of, for example, 0.1 cP to 100 cP. Alternatively, the optical measurement cell 2 may be one containing alcohol or organic solvent.

Figure 3:
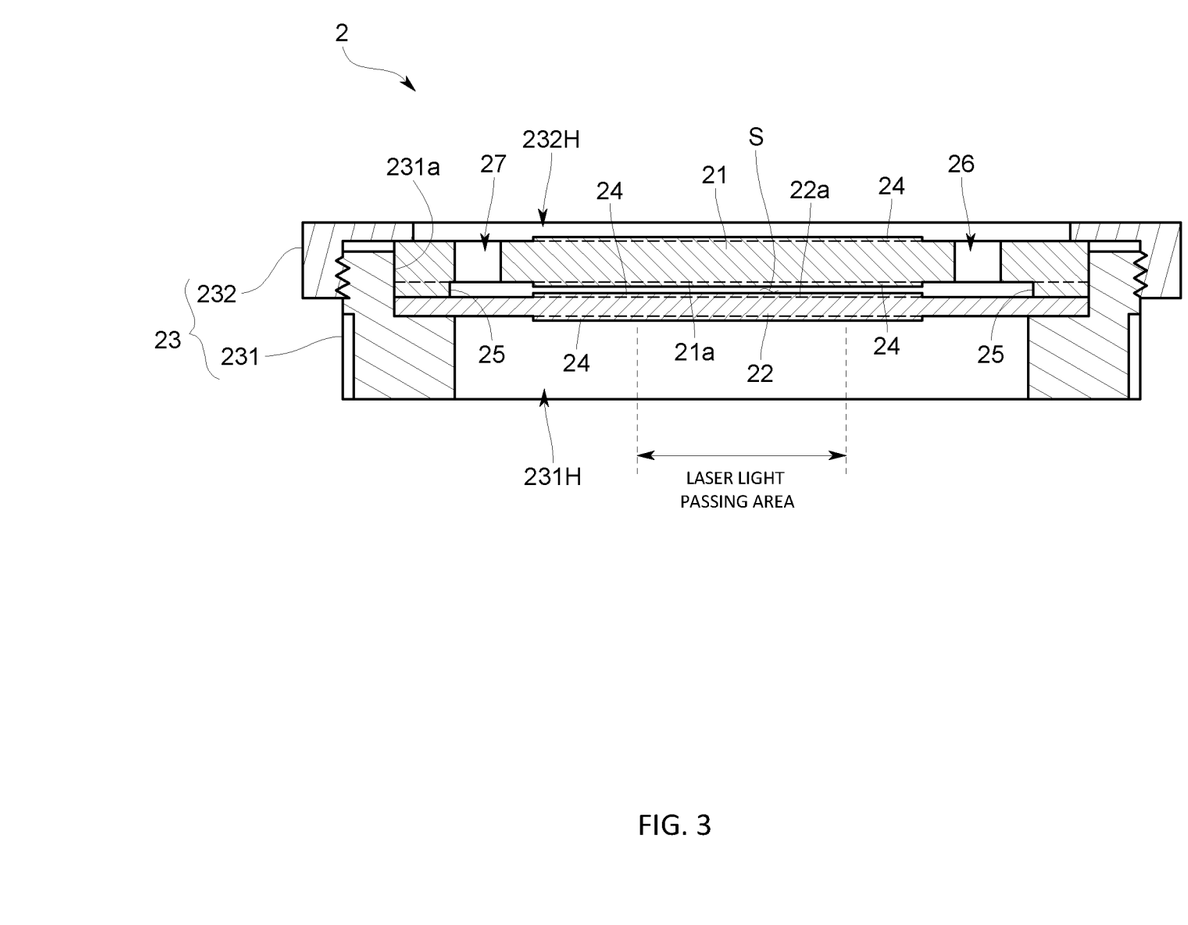
FIG. 3 is a cross-sectional view schematically illustrating the configuration of the optical measurement cell in the same embodiment.

Specifically, as illustrated in FIG. 3, the optical measurement cell 2 includes: a pair of light transmitting plates 21 and 22 respectively having opposite surfaces 21a and 22a facing each other; and a sandwiching mechanism 23 adapted to sandwich and hold the pair of light transmitting plates 21 and 22 from the outside.

The each of the light transmitting plates 21 and 22 is made of, for example, quartz glass ($SiO_2$) allowing the laser light emitted from the light source 4 to pass therethrough. At least the opposite surfaces 21a and 22a of the respective light transmitting plates 21 and 22 are formed in a planar shape, and the respective light transmitting plates 21 and 22 in the present embodiment are flat plates. Also, the respective light transmitting plates 21 and 22 are formed in the same shape in a plan view, and in the present embodiment, in a substantially circular shape in the plan view (see FIG. 5). In addition, cutout parts 21x and 22x formed on the side surfaces of the respective light transmitting plates 21 and 22 are ones for circumferentially positioning the light transmitting plates 21 and 22 with respect to the below-described sandwiching mechanism 23.

As illustrated in FIG. 3, in laser light passing areas of the respective light transmitting plates 21 and 22, antireflective films 24 are formed. In the present embodiment, the antireflective films 24 are formed in the central parts including the laser light passing areas. The antireflective films 24 are formed on both of the inner surfaces (opposite surfaces 21a and 22a) and outer surfaces of the light transmitting plates 21 and 22. The antireflective films 24 in the present embodiment are evaporated films formed by an evaporation method. In addition, the respective antireflective films 24 are ones having substantially the same film thickness throughout, and the antireflective films 24 formed on the respective opposite surfaces 21a and 22a have mutually the same film thickness.

Figure 4:
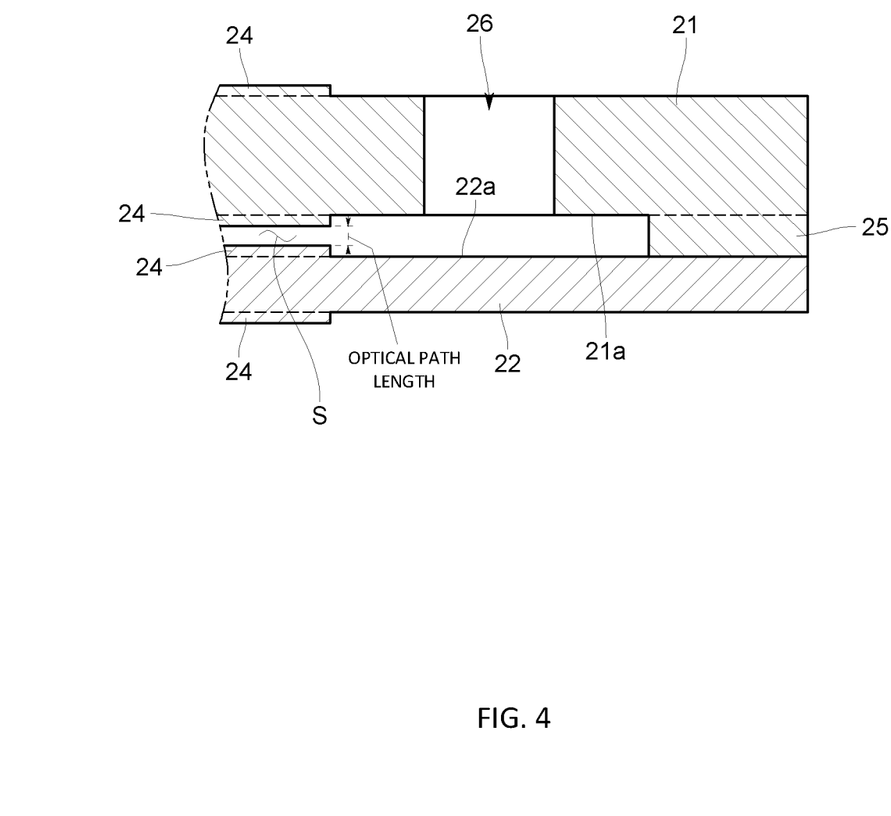
FIG. 4 is a partially enlarged cross-sectional view schematically illustrating the configuration of a pair of light transmitting plates in the same embodiment.
Figure 5:
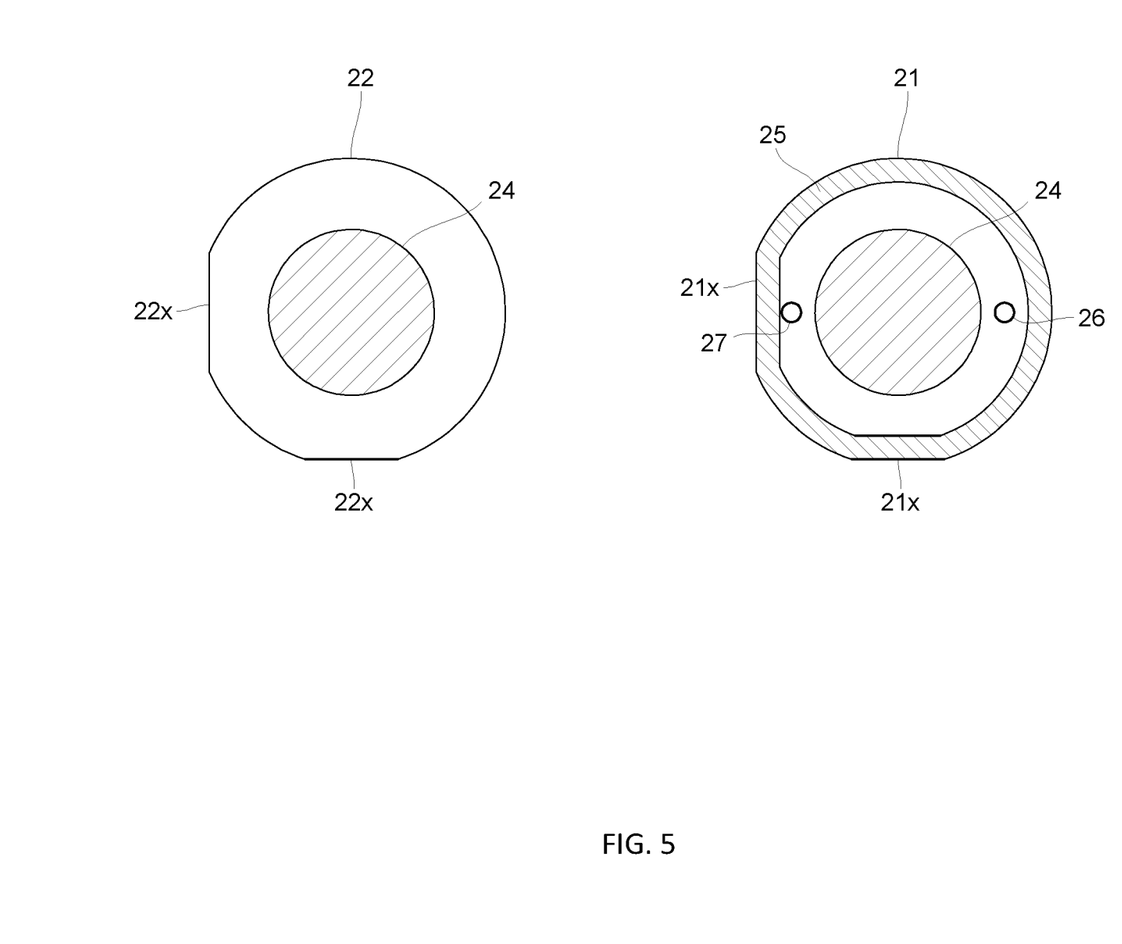
FIG. 5 is a plan view of the pair of light transmitting plates in the same embodiment.

Further, as illustrated in FIGS. 3 to 5, in the outer edge part of the opposite surface 21a of one light transmitting plate 21 (hereinafter also referred to as a first light transmitting plate 21), a spacer film 25 is formed over the entire circumference.

As particularly illustrated in FIG. 4, the spacer film 25 is one that contacts with the opposite surface 22a of the other light transmitting plate 22 (hereinafter also referred to as a second light transmitting plate 22) to define the distance between the pair of opposite surfaces 21a and 22a, and has substantially the same film thickness over the entire circumference.

The spacer film 25 is one directly deposited and integrally formed on the opposite surface 21a of the first light transmitting plate 21. That is, the spacer film 25 is one that is deposited on the opposite surface 21a and directly contacts with the opposite surface 21a. The spacer film 25 is an evaporated film formed using an evaporation method, a sputtered film formed using a sputtering method, a plating film formed using a plating method, or a printed film formed using a printing method. The spacer film 25 in the present embodiment is a thin film made of silicon dioxide ($SiO_2$) that is the same material as that of the light transmitting plates. The spacer film 25 forms a projected rim part integrally in the outer edge part of the opposite surface 21a of the first light transmitting plate 21. Further, the spacer film 25 is formed of a material having corrosion resistance to the test liquid having corrosiveness, such as an organic solvent.

In the present embodiment, the antireflective films 24 are formed on the pair of opposite surfaces 21a and 22a at the inner side of the spacer film 25. For this reason, the thickness of the spacer film 25 is set to a value of a predetermined distance by which the pair of opposite surfaces 21a and 22a are separated so that the distance between the pair of antireflective films 24 becomes equal to a desired optical path length (e.g., 1 μm). That is, the thickness of the spacer film 25 is set to a value of the sum of the desired optical path length and the thicknesses of the antireflective films 24 on the opposite surfaces 21a and 22a. Specifically, the thickness of the spacer film 25 is 5 μm or less, and when the spacer film 25 is a vapor deposition film, the minimum value thereof is one atomic layer.

In addition, when the antireflective films 24 are formed on the entire opposite surfaces 21a and 22a and the spacer film 25 is formed on one of the antireflective films 24, the thickness of the spacer film 25 is set to the same value as the desired optical path length without taking account of the thicknesses of the antireflective films 24.

Figure 6:
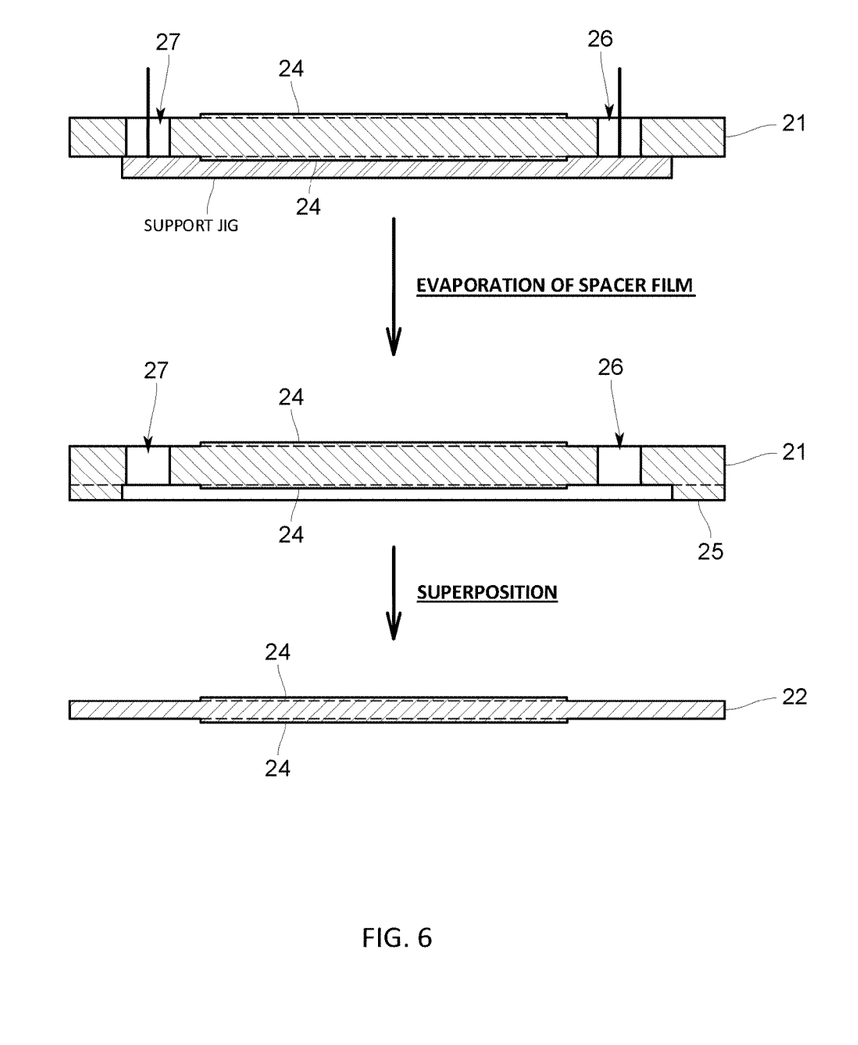
FIG. 6 is a schematic view illustrating a method for manufacturing the optical measurement cell in the same embodiment.

Further, the first light transmitting plate 21 formed with the spacer film 25 is provided with: an introduction part 26 for introducing the test liquid X between the pair of opposite surfaces 21a and 22a; and a lead-out part 27 for leading out the test liquid X. The introduction part 26 and the lead-out part 27 are provided on the inner side of the spacer film 25, and in the present embodiment, are through-holes provided penetrating through the first light transmitting plate 21. These through-holes 26 and 27 are sealed by plugs 28 and 29. In addition, when the spacer film 25 is an evaporated film, as illustrated in FIG. 6, the film can be evaporated with the first light transmitting plate 21 held by a support jig through the through-holes 26 and 27 such that the opposite surface 21a of the first light transmitting plate 21 faces downward.

In addition, the optical measurement cell 2 is set in the cell holder 7 in a state where the optical measurement cell 2 is sealed by the plugs 28 and 29 as illustrated in FIG. 2. That is, the optical measurement cell 2 is set such that the plugs 28 and 29 do not block the light from the light source 4 during the measurement. Specifically, in a configuration where the particle properties measuring instrument has two types of light sources 4 (e.g., a laser light source and an LED), the optical measurement cell 2 is set such that the plugs 28 and 29 are at positions withdrawn from an optical path from each of the light sources 4. In addition, FIG. 2 assumes a configuration where an LED emits light obliquely from above, in which the optical measurement cell 2 is set in such a manner as to position the plugs 28 and 29 left and right. Also, the optical measurement cell 2 is sealed by the plugs 28 and 29, and thereby the test liquid X can be prevented from vaporizing.

Further, the thickness of the first light transmitting plate 21 is configured to be larger than the thickness of the second light transmitting plate 22. The light transmitting plate having smaller plate thickness (the second light transmitting plate 22) is more easily reflected with the temperature of the test liquid X and a variation in it than the light transmitting plate having larger plate thickness (the first light transmitting plate 21). For this reason, by detecting the temperature of the light transmitting plate having smaller plate thickness (the second light transmitting plate 22) with, for example, a radiation thermometer (not illustrated) built into the particle properties measuring instrument, the temperature of the test liquid X in the optical measurement cell 2 can be accurately measured.

The sandwiching mechanism 23 is one that sandwiches the pair of light transmitting plates 21 and 22 from the outside to form a test liquid containing space S between the pair of opposite surfaces 21a and 22a. The test liquid containing space S is a space formed on the inner side of the spacer film 25.

As illustrated in FIG. 3, the sandwiching mechanism 23 in the present embodiment includes: a first sandwiching element 231 having a containing part 231a for containing the pair of light transmitting plates 21 and 22; and a second sandwiching element 232 sandwiching the pair of light transmitting plates 21 and 22 with the first sandwiching element 231. In addition, the pair of light transmitting plates 21 and 22 is configured to be sandwiched by screwing the second sandwiching element 232 onto the first sandwiching element 231. By screwing the respective sandwiching elements 231 and 232 together to sandwich the pair of light transmitting plates 21 and 22 as described, the pair of light transmitting plates 21 and 22 are uniformly applied with pressing force over the entire circumferential direction, and thereby the spacer film 25 can be uniformly pressed against the opposite surface 22a of the second light transmitting plate over the entire circumferential direction. This makes it possible to accurately determine the optical path length.

Note that the containing part 231a of the first sandwiching element 231 is provided with positioning parts (not illustrated) for positioning by touching the cutout parts 21x and 22x formed on the side surfaces of the pair of light transmitting plates 21 and 22. Also, the first sandwiching element 231 and the second sandwiching element 232 are respectively formed with opening parts 231H and 232H so that the laser light can pass through the pair of light transmitting plates 21 and 22. In addition, at least the outer circumferential surface of the second sandwiching element 232 is subjected to antislip treatment such as knurling upon screwing.

By superposing the pair of light transmitting plates 21 and 22 on each other and sandwiching them in the sandwiching mechanism 23, the measurement cell 2 is configured. The measurement cell 2 configured as described is set in the cell holder 7. In this state, the test liquid X is introduced through the introduction part 26 to fill the test liquid containing space S with the test liquid X. Then, the laser light is emitted from the light source 4 to calculate the particle size distribution of the particles contained in the test liquid X.

Since the cell length (optical path length) of the optical measurement cell 2 is determined by the thickness of the spacer film 25, it turns out that particle sizes larger than the optical path length in the particle size distribution are caused by measurement errors. Accordingly, in the calculation device 6, it is possible to perform data processing such as deleting or ignoring calculation results corresponding to the particle sizes equal to or larger than the optical path length. At this time, along with deleting or ignoring the calculation results corresponding to the particle sizes equal to or more than the optical path length, using the particle sizes equal to or more than the optical path length to correct a particle size distribution of particles whose sizes are less than the optical path length is conceivable.

Effects of the Present Embodiment

In the particle properties measuring instrument 100 of the present embodiment configured as described above, since the spacer film 25 is formed on the one opposite surface 21a of the pair of light transmitting plates 21 and 22, only by superposing the pair of light transmitting plates 21 and 22 on each other, the optical measurement cell 2 having a predetermined optical path length can be configured, thus making it possible to facilitate the assembly of the optical measurement cell 2. Also, since the optical path length can be defined by the thickness of the spacer film 25 integrally formed on the opposite surface 21a, it is not necessary to take account of spacer deformation or damage occurring when a spacer as a separate body is used, and therefore the optical path length can be shortened. Further, since a spacer as a separate body is not used, an assembling error of the optical measurement cell 2 can be reduced, and as a result, the optical axis alignment of the optical measurement cell 2 performed before measuring the particle size distribution can be facilitated. In addition, since the spacer film 25 is integrally formed on the first light transmitting plate 21, when cleaning the optical measurement cell 2, the cleaning work can be simplified.

Variations

Note that the present invention is not limited to the above-described embodiment.

For example, the above-described embodiment is configured to form the introduction part 26 and the lead-out part 27 in the first light transmitting plate 21, but may be configured to form one of the introduction part 26 and the lead-out part 27 in the first light transmitting plate 21 and form the other one of the introduction part 26 and the lead-out part 27 in the second light transmitting plate 22. This configuration makes it possible to standardize the first light transmitting plate 21 and the second light transmitting plate 22 in configuration, and therefore the number of parts can be reduced.

Also, on the outer surface of at least one of the first light transmitting plate 21 and the second light transmitting plate 22, an electrically conductive film serving as a heat generation part may be formed. In this configuration, by using a transparent conductive film as the electrically conductive film, the whole including the area where the light is incident or output can be heated. By using the electrically conductive film, the temperature of the test liquid X can be controlled to, for example, 80° C. In this case, when the temperature of the light transmitting plate having smaller plate thickness (the second light transmitting plate 22) is detected by a radiation thermometer or the like, the electrically conductive film is formed on the light transmitting plate having larger plate thickness (the first light transmitting plate 21). When the electrically conductive film is not a transparent conductive film, it is conceivable to form the electrically conductive film with the laser light passing area of that light transmitting plate avoided.

The electrically conductive film may be formed on the inner surface (opposite surface) of the light transmitting plate. In this case, the electrically conductive film may also be used as the spacer film. That is, the spacer film may be formed as the electrically conductive film. The light transmitting plate can be simplified in configuration and also the manufacturing cost thereof can be reduced.

Further, in the above-described embodiment, the spacer film 25 is provided over the entire circumference of the outer edge part of the first light transmitting plate 21, but may be provided intermittently in the outer edge part. In this case, the test liquid X leaks out from between adjacent portions of the spacer film 25, and therefore it is conceivable to provide the sandwiching mechanism or the like with a sealing structure so as to prevent the test liquid X from leaking to the outside of the pair of light transmitting plates 21 and 22.

In the above-described embodiment, the cutout parts 21 x, 22 x are formed on the side surfaces of the pair of light transmitting plates 21, 22. However, these cutout parts may not be formed. In this case, the second transparent plate 22 on which the spacer film 25 is not formed can be used irrespective of the front and back sides.

In the above-described embodiment, the light transmitting plates are formed in the substantially circular shape in the plan view, but may be of another shape such as a rectangular shape in the plan view.

The above-described embodiment is one adapted to introduce the test liquid X into the optical measurement cell 2 through the introduction part 26, but may be one adapted to contain the test liquid X in the optical measurement cell 2 without the introduction part 26. For example, before assembling the optical measurement cell 2, the test liquid X may be dropped and stored on the inner side of the spacer film 25 of the first light transmitting plate 21 using some tool such as a dropper, and the optical measurement cell 2 may be assembled with the first light transmitting plate 21 in this state and the second light transmitting plate 22 superposed on each other.

In the above-described embodiment, the optical measurement cell 2 is one such that the sandwiching mechanism 23 sandwiches the pair of light transmitting plates 21 and 22, but may be one such that the pair of light transmitting plates 21 and 22 and the sandwiching mechanism 23 are provided with a sealing member for sealing the gap between the test liquid containing space S and the outside to improve sealing performance. Such an optical measurement cell 2 can be preferably used when the test liquid X is H₂O- or O₂-vulnerable. Also, when containing the test liquid in this optical measurement cell 2, the containing work is performed under an inert gas atmosphere such as in a glove box. In addition, the plugs 28 and 29 provided for the introduction part 26 and the lead-out part 27 are also provided with sealing members to improve the sealing performance.

The optical measurement cell 2 is configured to have the two through-holes serving as the introduction part and the lead-out part, but may be configured to have one through-hole.

The optical measurement cell 2 is one containing liquid such as the test liquid, but may be one containing sample gas.

The optical measurement cell 2 of the above-described embodiment is of a batch type, but may be of a flow type in which the test liquid X is replaced with the optical measurement cell 2. In this case, by continuously introducing the test liquid X through the introduction part 26, the optical measurement cell 2 can be configured as a flow type cell. For example, when the test liquid X is introduced through the introduction part 26, surface tension causes the capillary phenomenon because of the shot optical path length, and consequently the test liquid X flows between the pair of light transmitting plates 21 and 22.

Figure 7:
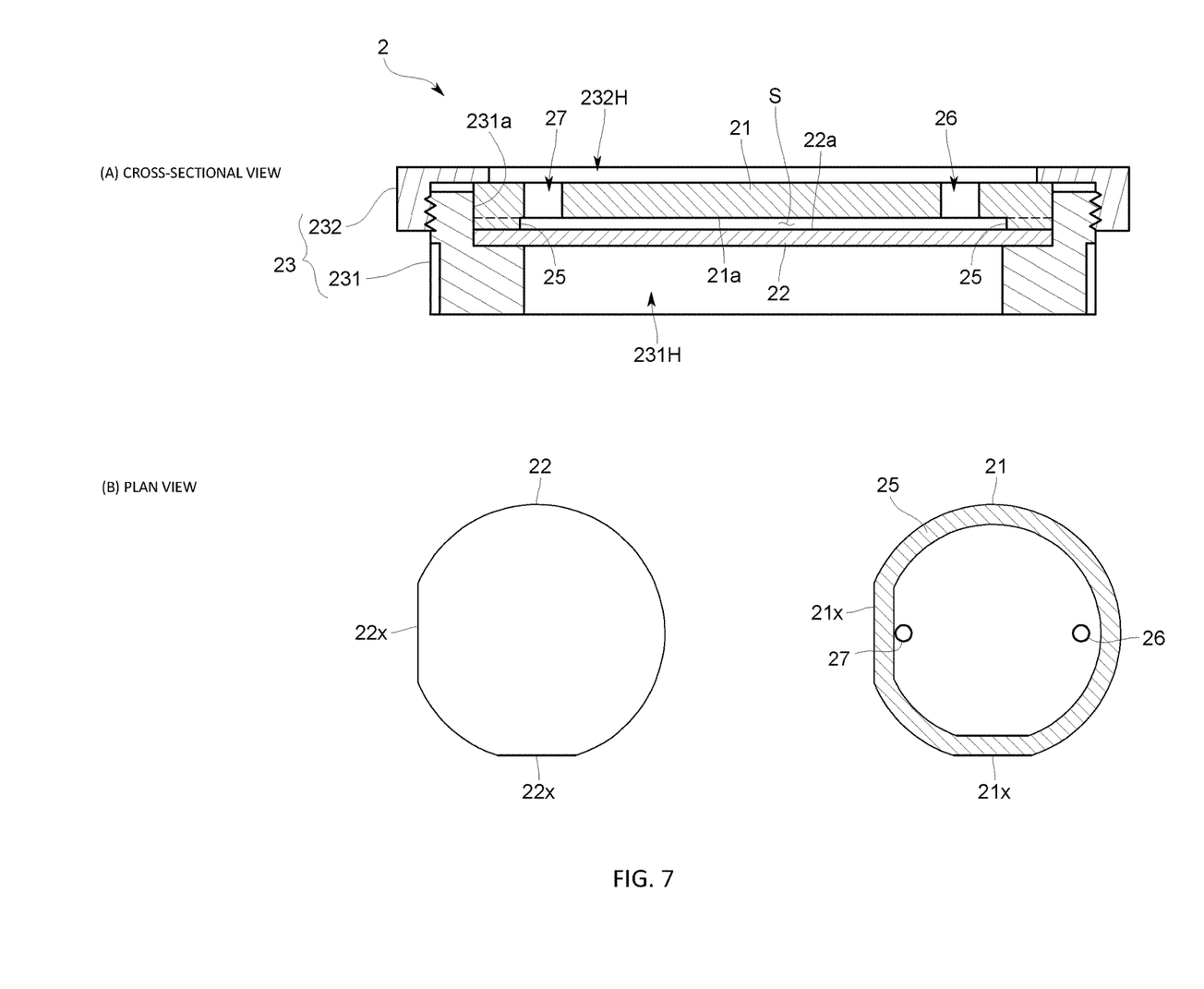
FIG. 7 includes a cross-sectional view schematically illustrating the configuration of an optical measurement cell and a plan view of a pair of light transmitting plates in a variation.

In the above-described embodiment, the light transmitting plates are formed with the antireflective films. However, as illustrated in FIG. 7, the light transmitting plates may be formed with no antireflective film. In the case of forming no antireflective film, a tilt angle of the cell holder has to be adjusted so as to prevent reflected light from entering any of the optical detectors, but the fear of damaging the antireflective films can be eliminated at the time of cleaning the light transmitting plates, and the manufacturing cost of the light transmitting plates can also be reduced. In the case where the antireflective film is not formed, when the reflected light enters the optical detector, it is also possible not to use the light intensity signal of the optical detector for calculating the particle size distribution.

In addition, the particle size distribution measuring instrument of the above-described embodiment is of a so-called diffraction/scattering type, but may be of a so-called dynamic light scattering type configured to measure the particle size distribution by irradiating the test liquid in the optical measurement cell with the laser light, and analyzing the fluctuation of scattered light caused by the Brownian motion of the particles in the sample at the time.

Further, the optical measurement cell according to the present invention may be used for, in addition to the particle size distribution measuring instrument, an optical analyzer utilizing, for example, infrared spectroscopy.

Besides, it should be appreciated that the present invention is not limited to any of the above-described embodiment and variations, but can be variously modified without departing from the scope thereof.

REFERENCE SIGNS LIST

100: Particle properties measuring instrument
2: Optical measurement cell
21, 22: Light transmitting plate
21a: One opposite surface
22a: Other opposite surface
24: Antireflective film
25: Spacer film
26: Introduction part
27: Lead-out part

The invention claimed is:

1. A batch type optical measurement cell used in a particle size distribution measuring instrument for measuring particle size distribution by detecting laser diffraction/scattered light, comprising:
   a pair of light transmitting plates respectively having opposite surfaces facing each other and containing fluid between the pair of opposite surfaces of the pair of light transmitting plates, and
   a sandwiching mechanism adapted to sandwich and hold the pair of light transmitting plates from the outside, wherein
   one opposite surface of the pair of opposite surfaces includes a spacer film deposited thereon that contacts with the other opposite surface to define a distance between the pair of opposite surfaces,
   each of the pair of light transmitting plates is made of glass allowing laser light transmission, and
   the sandwiching mechanism presses the pair of light transmitting plates uniformly over a circumferential direction.

2. The batch type optical measurement cell according to claim 1, wherein
   the spacer film is an evaporated film, a plating film, a sputtered film, or a printed film formed on the one opposite surface.

3. The batch type optical measurement cell according to claim 1, wherein
   the light transmitting plate formed with the spacer film is provided with through holes, which include an introduction part for introducing the fluid between the pair of opposite surfaces and a lead-out part for leading out the fluid.

4. The batch type optical measurement cell according to claim 1, wherein
   at least one of the pair of light transmitting plates is formed with an electrically conductive film serving as a heat generation part.

5. The batch type optical measurement cell according to claim 1, wherein
   the pair of light transmitting plates are mutually different in thickness.

6. The batch type optical measurement cell according to claim 5, wherein one of the pair of light transmitting plates having a smaller thickness is more easily reflected with a temperature of the fluid between the pair of opposite surfaces.

7. A particle size distribution measuring instrument in combination with the batch type optical measurement cell according to claim 1, the particle size distribution measuring instrument including light detectors and a calculation device for calculating a particle size distribution of particles in a test liquid held in the optical measurement cell based on the light intensity of diffracted/scattered light caused by light irradiation of the test liquid by a light source.

8. The batch type optical measurement cell according to claim 1, wherein the spacer film is made of a same material as the light transmitting plates.

9. The batch type optical measurement cell according to claim 1, wherein the pair of light transmitting plates have a circular shape with a plurality of cutouts formed on side surfaces for circumferentially positioning the pair of light transmitting plates.

10. The batch type optical measurement cell according to claim 9, wherein the sandwiching mechanism includes a first element and a second element that sandwich the pair of light transmitting plates therebetween, one of the first element and the second element having a containing part that contacts the cutouts of each of the pair of light transmitting plates to circumferentially position the pair of light transmitting plates.

11. The batch type optical measurement cell according to claim 1, wherein the spacer film is formed in an outer edge part of the one opposite surface over an entire circumference and the sandwiching mechanism applies the pressing force uniformly over an entire circumferential direction of the spacer film.

* * * * *